July 30, 1957     L. M. MINSK     2,801,188
COATED GELATIN LIGHT FILTER
Filed March 17, 1955
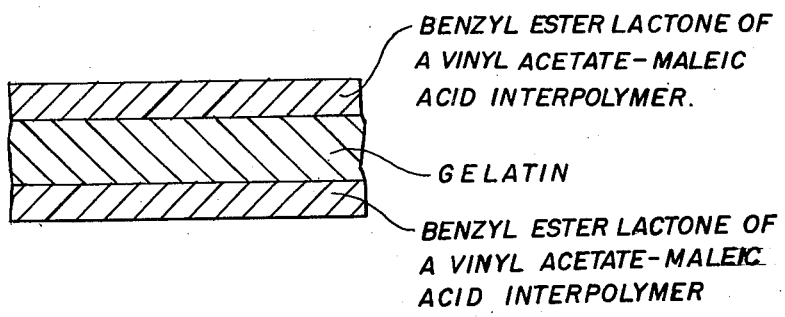
Louis M Minsk
INVENTOR.
BY
ATTORNEYS

United States Patent Office 2,801,188
Patented July 30, 1957

2,801,188
COATED GELATIN LIGHT FILTER

Louis M. Minsk, Rochester, N. Y., assignor to Eastman Kodak Company, Rochester, N. Y., a corporation of New Jersey Application March 17, 1955, Serial No. 495,048

2 Claims. (Cl. 117—68)

This invention concerns lacquer for coating photographic light filters, more particularly the use of a lacquer having a benzyl ester lactone of the vinyl acetate-maleic anhydride interpolymer as the resin component.

In the manufacture of gelatin filters for photographic purposes, it is customary to apply a lacquer over the dried filter to protect the surface from scratches, to reduce the moisture absorption and to permit lint, fingerprints, and dust to be wiped off. In the past various coatings have been used for this purpose, some of which were based on cellulose derivative compositions such as cellulose acetate, cellulose nitrate and the like.

A lacquer for surfacing photographic light filters should also have a refractive index very closely approximating that of gelatin. If the refractive index is sufficiently different from that of gelatin, a diffraction pattern may be observed by reflection. The lacquer should also be water resistant and resistant to water spotting.

One object of this invention is to provide a lacquer for photographic light filters having a refractive index similar to that of gelatin. Another object is to provide a photographic filter resistant to water spotting and with good resistance to abrasion. An additional object is to provide a lacquer having a benzyl ester lactone of the vinyl acetate-maleic anhydride interpolymer as the resin component.

The drawing shows a diagrammatic representation of a gelatin layer coated on opposite sides with the benzyl ester lactone of a vinyl acetate-maleic acid interpolymer.

The above objects are obtained by interpolymerizing vinyl acetate with maleic anhydride followed by reacting the vinyl acetate-maleic anhydride intermediate with benzyl alcohol in the presence of an acid catalyst. The product may be designated as the benzyl ester lactone of the vinyl acetate-maleic anhydride interpolymer. Ethylene glycol monomethyl ether acetate is a satisfactory solvent for the preparation of the lacquer but other solvents may be used such as ethyl acetate, acetone, methyl ethyl ketone, 1,4 dioxane, chloroform-ethyl alcohol (85:15 by vol.) and the like.

The following example illustrates my invention but is not intended to limit it, inasmuch as other embodiments of my invention will be apparent to those skilled in the art.

Example I

In a five-liter flask equipped with a reflux condenser, a calcium chloride tube, and a mechanical stirrer were placed 300 grams of vinyl acetate-maleic anhydride interpolymer; 2400 cc. of benzyl alcohol; 60 grams of toluenesulfonic acid monohydrate. The reaction mixture was heated with stirring on a steam bath for 19 hours. The dope was diluted with acetone and poured in a fine stream into four gallons of stirred methanol to precipitate the polymer. The polymer was extracted with fresh methanol, filtered on to a Büchner funnel, and thus redissolved in 3 liters of acetone. The acetone dope was poured into stirred distilled water. The fibrous product was washed with distilled water until acid free and friable, centrifuged, and dried at 45° C. The yield was 334 grams.

A lacquer which was prepared by dissolving the fibrous product in ethylene glycol monomethyl ether acetate was coated on a gelatin light filter and dried at room temperature. The resulting coating could be wiped with a damp cloth to remove dust and the like and was resistant to water spotting.

The use of my lacquer for coating photographic light filters enables gelatin filters to be used with greater versatility and without the necessity of being encased between glass cover plates inasmuch as these coated filters can be satisfactorily cleaned with a damp cloth. Moreover, since the refractive index is 1.540, the same as that of gelatin, a diffractive pattern is not obtained by reflection.

I claim:

1. A gelatin light filter coated on at least one side with a lacquer composition comprising the benzyl ester lactone of a vinyl acetate-maleic anhydride interpolymer consisting of vinyl acetate and maleic anhydride, the resulting coating having a refractive index of about 1.540.

2. A gelatin light filter coated on both sides with a lacquer composition comprising the benzyl ester lactone of a vinyl acetate-maleic anhydride interpolymer consisting of vinyl acetate and maleic anhydride, the lacquer resulting in a coating having the refractive index of about 1.540.

References Cited in the file of this patent

UNITED STATES PATENTS

| | | |
|---|---|---|
| 2,306,071 | McNalley et al. | Dec. 22, 1942 |
| 2,450,746 | Bliss | Oct. 5, 1948 |

FOREIGN PATENTS

| | | |
|---|---|---|
| 466,898 | Great Britain | June 8, 1937 |